United States Patent [19]

Sato et al.

[11] Patent Number: 5,069,823

[45] Date of Patent: Dec. 3, 1991

[54] THIOPHENE COMPOUND AND METHOD FOR PRODUCTION THEREOF

[75] Inventors: Masa-aki Sato; Aizo Yamauchi, both of Tsukuba, Japan

[73] Assignees: Agency of Industrial Science and Technology; Ministry of International Trade & Industry, both of Tokyo, Japan

[21] Appl. No.: 487,440

[22] Filed: Mar. 2, 1990

[30] Foreign Application Priority Data

Mar. 29, 1989 [JP] Japan .................................. 1-77506
Mar. 29, 1989 [JP] Japan .................................. 1-77507

[51] Int. Cl.$^5$ .............................................. H01B 1/06
[52] U.S. Cl. .................................... 252/518; 252/500; 204/59 R
[58] Field of Search ............. 252/518, 500; 204/59 R; 526/256; 524/401, 80

[56] References Cited

PUBLICATIONS

Synthetic Metals, vol. 18, pp. 229-232 (1987), Masa-aki Sato, et al.
Journal of Chemical Society Chemical Communication, pp. 873 to 874 (1986), Masa-aki Sato, et al.

*Primary Examiner*—Josephine Barr
*Attorney, Agent, or Firm*—Oblon, Spivak, McClelland, Maier & Neustadt

[57] ABSTRACT

3-n-dodecylthiophene-3-methylthiophene copolymers are novel compounds having repeating units represented by the formula,

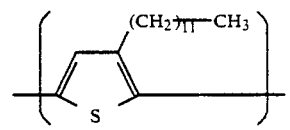

and repeating units represented by the formula,

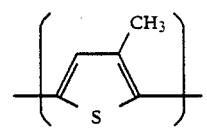

randomly and linearly arranged and possessing a weight average molecular weight in the range of 60,000 to 100,000. 3-n-dodecylthiophene-3-methylthiophene copolymer compositions are novel compounds obtained by doping the copolymers mentioned above with a dopant. The copolymer compositions are obtained by electrolyzing a solution which consists of a supporting electrolyte capable of releasing a dopant. 3-n-dodecylthiophene, 3-methylthiphene, and a solvent. The copolymers mentioned above is produced by reducing the product of the electrolysis.

5 Claims, 2 Drawing Sheets

THIOPHENE COMPOUND AND METHOD FOR PRODUCTION THEREOF

BACKGROUND OF THE INVENTION

1. Field of the Invention

This invention relates to thiophene compound copolymers and a method for the production thereof. More particularly, this invention relates to copolymers of 3-ndodecylthiophene and 3-methylthiophene, copolymer compositions resulting from doping the copolymers with a dopant, and an electrochemical method for the production thereof. These copolymers and copolymer compositions are used, depending on their qualities, for various electronic parts, electrodes, sensors, photoelectric conversion devices, various parts and devices, and the like.

2. Prior Art Statement

In recent years, the remarkable technical growth in the electronic industry has promoted development of materials possessing new and excellent electric functions. In the field of polymer chemistry, materials possessing various electric properties have been discovered and many of them have already found utility in practical applications. Efforts are being continued in search of materials possessing still more desirable electric properties. Particularly, organic electroconductive materials possessing electroconductivity are extensively usable for various electronic parts, electrodes, sensors, and photoelectric conversion devices, for example. Thus, research is being actively promoted for the development of organic electroconductive materials possessing outstanding characteristic properties.

The organic electroconductive materials which have been known in the art include those which are obtained by adding dopants to polyacetylene, polythiophene, poly(p-phenylene), polyphenylene sulfide, and polypyrrol and additionally include organometallic polymers. These organic electroconductive materials, however, have little practical value as polymer materials because they are insoluble in various solvents and are extremely difficult to mold because of their infusibility.

One of the present inventors continued a study on thiophene compound polymers. The inventions resulting from this study have been granted U.S. Pat. Nos. 4,691,005, 4,737,557, 4,877,852. For the divisional application of U.S. Pat. No. 4,877,852, U.S. Pat. application Ser. No. 07/306,581, a Notice of Allowance has already been received.

As thiophene type polymers, poly-(2,5thienylene) and poly-[2,5-(3-methylthienylene)]which are obtained respectively by electrochemically polymerizing thiophene and 3-methylthiophene and then electrochemically reducing the resultant polymers have been known to the art. These polymers, however, have little practical value as polymer materials because they are insoluble in various solvents and are extremely difficult to mold because of their infusibility.

Polymer compositions obtained by electrochemically polymerizing 3-longchain alkylthiophenes possessing a longchain alkyl group (having 6 to 12 carbon atoms) at the 3 position of the thiophene ring ["Synthetic Metal", Vol. 18, pages 229-232 (1987)]and homopolymers of poly-[2,5-(3-longchain alkyl thienylenes)]obtained by electrochemically reducing the polymer compositions have been known to the art ["Journal of Chemical Society Chemical Communication", pages 837 to 874 (1986)]. Unless these polymer compositions are subjected to drawing or other such processing they exhibit an electrical conductivity of only 100 S/cm and as such are not satisfactory as materials for organic electroconductive devices or as materials for applications requiring various electric and electronic functions.

One object of this invention is to provide a novel electroconductive copolymer composition which possesses excellent electroconductivity, excels in moldability, and enjoys high practical value as by permitting economic production.

Another object of this invention is to provide a novel thiophene copolymer with a high degree of polymerization which is soluble in solvents, excellent in moldability, and useful as materials for parts fitting various applications and as polymer materials for applications of various electric and electronic functions.

SUMMARY OF THE INVENTION

The present inventors continued a study with a view to accomplishing the objects described above. They have perfected this invention as the result.

To be specific, this invention is directed to a 3-n-dodecylthiophene-3-methylthiophene copolymer, comprising repeating units represented by the formula:

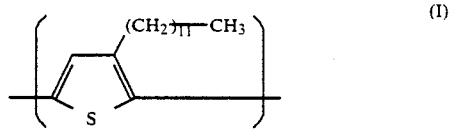

(I)

and repeating units represented by the formula:

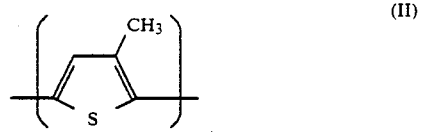

(II)

having these repeating units randomly and linearly arranged, containing the repeating units of the formula (II) in a ratio in the range of 34 to 65 mol%, and possessing a weight average molecular weight in the range of 60,000 to 100,000; to an electroconductive copolymer composition essentially consisting of said 3-n-dodecylthiophene-3 -methylthiophene copolymer and 1 to 50 mol%, based on the total amount of the repeating units, of adopant doped in the copolymer; to a method for the production of an electroconductive copolymer composition essentially consisting of a 3-n-dodecylthiophene-3-methylthiophene copolymer, comprising repeating units represented by the formula:

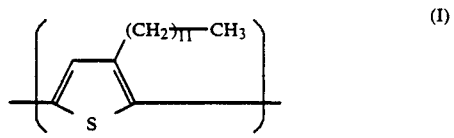

(I)

and repeating units represented by the formula:

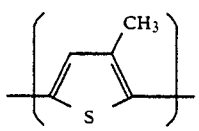 (II)

having these repeating units randomly and linearly arranged, containing the repeating units of the formula (II) in a ratio in the range of 34 to 65 mol%, and possessing a weight average molecular weight in the range of 60,000 to 100,000 and 1 to 50 mol%, based on the total amount of the repeating units, of a dopant used for doping the copolymer, which method essentially consists of providing an anode and a cathode in a solution consisting of a solvent, 3-n-dodecylthiophene, 3-methylthiophene, and supporting electrolyte capable of releasing the dopant and subsequently conducting electrolysis by passing an electric current through the solution through the medium of the electrodes; and to a method for the production of a 3-n-dodecylthiophene-3-methylthiophene copolymer comprising the repeating units of the formulas (I) and (II) mentioned above, having these repeating units randomly and linearly arranged, containing the repeating units of the formula (II) in a ratio in the range of 34 to 65 mol%, and having a weight average molecular weight in the range of 60,000 to 100,000, which method essentially consists of effecting the passage of electric current in the solution by following the procedure described above and then continuing the passage of electric current with the polarities of the electrodes reversed.

The above and other features and objects of the invention will become apparent with the following detailed description made with reference to the attached drawings.

DETAILED DESCRIPTION OF THE PREFERRED EMBODIMENTS

Figure 1:
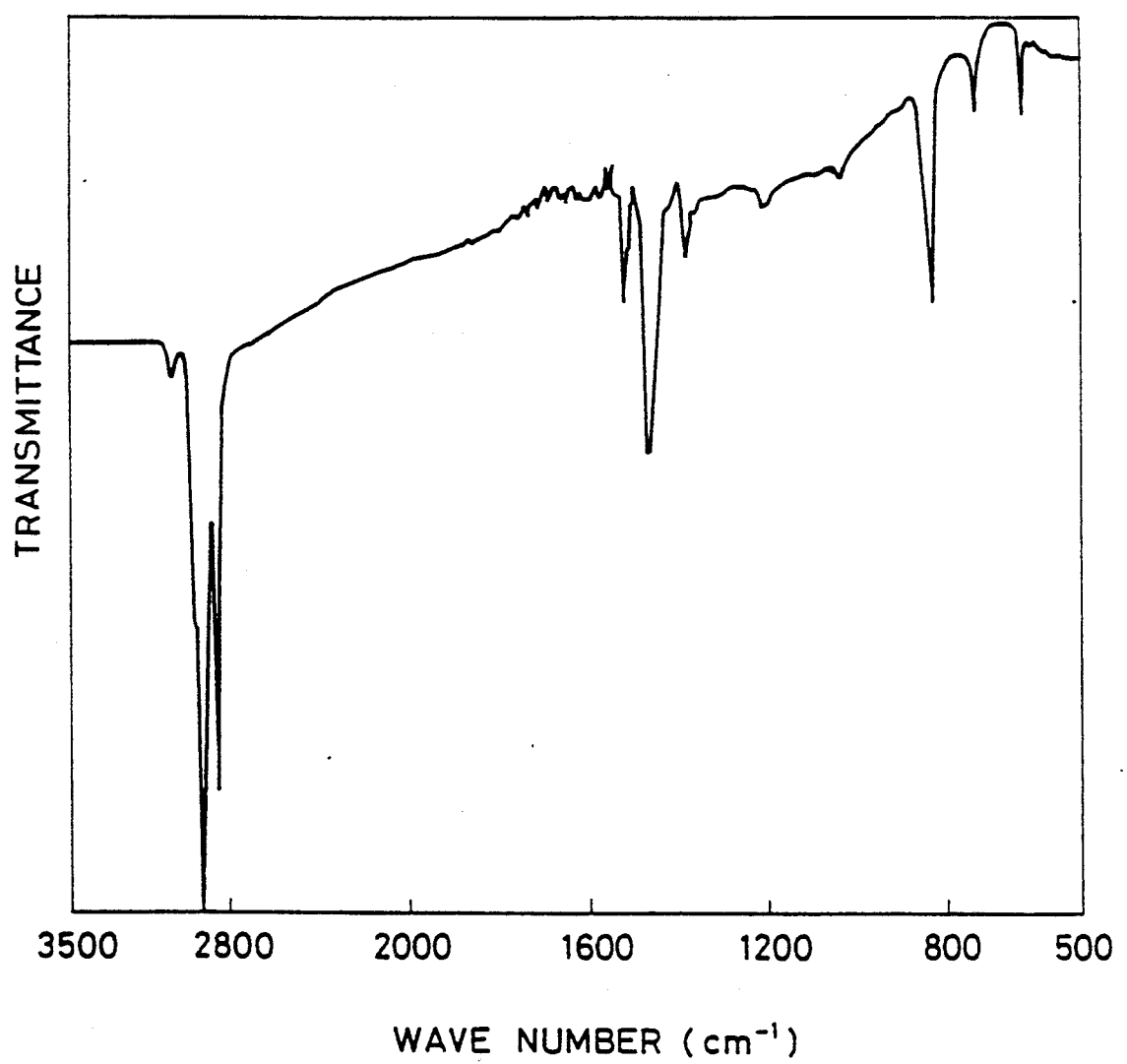
FIG. 1 is an infrared absorption spectrum of a copolymer obtained in Example 7.

The copolymer compositions of this invention are novel substances not yet reported in any literature. By electrochemical reduction, they are deprived of a nonionic dopant and consequently converted into novel 3-n-dodecylthiophene-3-methylthiophene copolymers comprising repeating units [A] represented by the formula (I) and repeating units [B] represented by the formula (II), having these repeating units randomly and linearly arranged, containing the repeating units [B] in a ratio in the range of 34 to 65 mol%, and having a weight average molecular weight in the range of 60,000 to 100,000.

The thiophene compounds which are usable in the present invention are limited to 3-n-dodecylthiophene and 3-methylthiophene.

The copolymers obtained by the use of one member selected from among 3-n-butylthiophene, 3-hexylthiophene, 3-n-octylthiophene, and 3-n-decylthiophene in place of 3-dodecylthiophene used for the electrochemical polymerization contemplated by this invention have conspicuously low solubility.

The supporting electrolyte in this invention is capable of releasing a dopant. The dopants which are usable in this respect include such anions as hexafluorophosphoric acid ion, hexafluoroarsenic acid ion, tetrafluoroboric acid ion, perchloric acid ion, trifluoromethanesulfonic acid ion, various halogen ions, and sulfuric acid ion, for example. Among the anions mentioned above, hexafluorophosphoric acid ion, hexafluoroarsenic acid ion, tetrafluoroboric acid ion, perchloric acid ion, and trifluoromethanesulfonic acid ion prove to be desirable because they are capable of imparting to the produced copolymer compositions electroconductivity (120 to 240 S/cm) sufficiently high for commercially feasibilizing the compositions. As the supporting electrolyte mentioned above, a salt containing the anion mentioned above is used.

The electrodes which are usable in the electrochemical polymerization of this invention include electrodes made of noble metals such as, for example, gold and platinum, nickel, and carbon and glass electrodes of indium oxide or tin oxide conducting glass, for example. The anodes usable herein include electrodes made of aluminum and mercury besides those mentioned above, for example.

The electrochemical polymerization is carried out in an electrolytic solution prepared by dissolving in a solvent such as nitrobenzene, benzonitrile, or propylene carbonate a supporting electrolyte in an amount calculated to account for a concentration in the range of 0.01 to 0.2 mol/liter and 3-dodecylthiophene and 3-methylthiophene, as monomers, in a mixing ratio in the range of 4 : 1 to 1.5 : 1 and in amounts calculated to account for a total concentration in the range of 0.15 to 0.35 mol/liter, preferably under an inert atmosphere of nitrogen or argon by the method of constant-current electrolysis, constant-potential electrolysis, or constant-voltage electrolysis. The passage of electric current is continued for a period suitably selected so that the copolymer composition to be formed on the anode acquires a desired thickness of the copolymer film.

The copolymer compositions obtained as described above are electroconductive copolymer compositions each comprising 3-n-dodecylthiophene-3-methylthiophene copolymers having repeating units [A] represented by the formula (I) and repeating units [B] represented by the formula (II) randomly and linearly arranged, containing the repeating units [B] in a ratio in the range of 34 to 65 mol%, and having a weight-average molecular weight in the range of 60,000 to 100,000 and 1 to 50 mol%, based on the total amount of the repeating units of [A] and [B], of the aforementioned dopant doped in the copolymers. These copolymer compositions are soluble in such solvents as toluene and tetrahydronaphthalene.

When these copolymer compositions are electrochemically reduced as described above, they produce the 3-n-dodecylthiophene-3-methylthiophene copolymers contemplated by this invention.

These copolymers are also novel compounds. Since they are soluble in such solvents as methylene chloride, chloroform, benzene, toluene, hexane, and tetrahydronaphthalene and are easy of molding, they are usable as novel polymer materials. The infrared spectra of these copolymers show a band at 820 cm$^{-1}$, indicating that the copolymers have a regular structure which can be denoted as poly(3-alkylthiophene-2,5-diyl). The proportion of the repeating units [B] of the formula (II) in the copolymers has been determined based on the absorbance (720 cm$^{-1}$) relative to methylene of 3-absorbance longalkylthiophene units and the absorbance (620 cm$^{-1}$) relative to methyl group of 3-methylthiophene units. The proportion of [B] has been further determined in accordance with the $^1$H-NMR of the copolymer in d-chloroform. The weight average molecular weight has been determined by the GPC using chloroform. Since an absorption due to one $\pi$-$\pi$ transition is observed in the visible spectra of these copolymers and since the electric structure is considered to be uniform, these copolymers has been identified as random copolymers.

The thiophene type copolymers of this invention exhibit solubility in solvents and possess highly satisfactory moldability and the copolymer compositions produced by doping the copolymers with a dopant exhibit solubility in such solvents as tetrahydronaphthalene and toluene, possess highly satisfactory moldability, and excel in electroconductivity. Thus, they are useful as materials for organic electroconductive materials and as polymer materials for such devices as electrodes, sensors, and photoelectric conversion devices which require electric and electronic functions.

Now, this invention will be described more specifically below with reference to working examples and comparative experiments.

EXAMPLE 1

A solution was prepared by dissolving 0.404 g (1.6 mmols) of 3-n-dodecylthiophene and 0.039 g (0.4 mmol) of 3-methylthiophene in 10 ml of nitrobenzene and adding 0.069 g (0.25 m m ol) of tetraethyl ammonium hexafluorophosphate to the resultant solution.

Then, in an electrolytic cell using an ITO glass electrode as an anode and a platinum plate as a cathode, the aforementioned solution was placed, stirred with blown argon gas for 15 minutes, and left electrochemically polymerizing at 5° C. When the polymerization was continued for 8 minutes with a current density of 2 mA/cm$^2$, there was obtained on the anode a black film of copolymer composition of which the copolymer was doped with 24 mol%, based on the total amount of monomer units (repeating units [A] and [B]), of hexafluorophosphoric acid ion.

This film of copolymer composition had a thickness of 6.6 μm and electroconductivity of 121 S/cm. It exhibited solubility of about 90% (W/W) in toluene and tetrahydronaphthalene.

EXAMPLE 2

When 3-n-dodecylthiophene and 3-methylthiophene were electrochemically polymerized at a current density of 2 mA/cm$^2$ for 8 minutes in the same manner as in Example 1, there was obtained on the anode a black film of copolymer composition doped with hexafluorophosphoric acid ion.

Then, the electrodes were reversed in polarity and the composition was electrochemically reduced at a current density of 0.5 mA/cm$^2$ by passsing electric current until the voltage difference between the electrodes surpassed 5 V and reached a constant level, to deprive the composition of hexafluorophosphoric acid ion. Then, what resulted from the electrochemical reduction was washed with methanol and dried, to obtain a red film of copolymer. By comparison of the absorbances of the peaks at 720 cm$^{-1}$ and 620 cm$^{-1}$ in the infrared spectrum of this copolymer, the proportion of the 3-methylthiophene units in the copolymer was found to be 37 mol%.

This copolymer exhibited solubility of not less than 97% (W/W) in methylene chloride, benzene, and chloroform. Based on the $^1$H-NMR of the copolymer dissolved in d-chloroform, the proportion of 3-methylthiophene units contained in the copolymer was found to be 34 mol%. Based on the GPC using chloroform, this copolymer was found to possess a weight average molecular weight of 65,000.

EXAMPLE 3

Electrochemical polymerization was carried out by following the procedure of Example 1, except that the weight of 3-n-dodecylthophene was changed to 0.379 g (1.5 mmols) and that of 3-methylthiophene to 0.049 g (0.5 mmol) respectively. Consequently, there was obtained a black film of copolymer composition whose polymer was doped with 13 mol%, based on the total amount of the monomer units, of hexafluorophosphoric acid ion.

This copolymer composition possessed a thickness of 6.0 μm and exhibited electroconductivity of 155 S/cm. It exhibited solubility of about 85% (W/W) in tetrahydronaphthalene and solubility of about 50% (W/W) in toluene.

EXAMPLE 4

By faithfully following the procedure of Example 3, 3-n-dodecylthiophene and 3-methylthiophene was electrochemically polymerized, except that 0.043 g (0.20 mmol) of tetraethyl ammonium tetrafluoroborate was used in the place of tetraethyl ammonium hexafluorophosphate. Consequently, there was obtained a black film of copolymer composition whose polymer was doped with 22 mol%, based on the amount of the monomer units, of tetrafluoroboric acid ion.

This copolymer composition had a thickness of 5.6 μm and exhibited electroconductivity of 170 S/cm. It exhibited solubility of about 80% (W / W) i n tetrahydronaphthalene.

EXAMPLE 5

Electrochemical polymerization was carried out by faithfully repeating the procedure of Example 1, except that the weight of 3-n-dodecylthiophene was changed to 0.336 g (1.33 mmols) and that of 3-methylthiophene to 0.066 g (0.67 mmol) respectively. Consequently, there was obtained a black film of copolymer composition whose polymer was doped with 22 mol%, based on the amount of the monomer units, of hexafluorophosphoric acid ion.

This copolymer composition had a thickness of 5.1 μm and exhibited electroconductivity of 239 S/cm. It exhibited solubility of about 70% (W / W) in tetrahydronaphthalene.

EXAMPLE 6

A black film of copolymer composition was obtained by electrochemically polymerizing 3-n-dodecylthiophene and 3-methylthiophene in the same manner as in Example 5. This copolymer composition was electrochemically reduced by following the procedure of Example 2. The product consequently obtained was washed with methanol and dried, to produce a red film of copolymer.

Based on the infrared spectrum of this copolymer, the proportion of the 3-methylthiophene unit contained in the copolymer was found to be 61 mol%.

This copolymer exhibited solubility of about 75% (W/W) in methylene chloride, benzene, and chloroform. Based on the ¹H-NMR of the copolymer dissolved in d-chloroform, the proportion of the 3-methylthiophene unit contained in the copolymer was found to be 52 mol%. The copolymer using chloroform exhibited solubility of about 91% (W/W) in methylene chloride, benzene, and chloroform. Based on the ¹H-NMR of the copolymer dissolved in d-chloroform, the proportion of the 3-methylthiophene unit contained in the copolymer was found to be 42 mol%. Based on the GPC using chloroform, this copolymer was found to possess a weight average molecular weight of 75,000.

EXAMPLE 7

A black film of copolymer composition was obtained by electrochemically polymerizing 3-n-dodecylthiophene and 3-methylthiophene in the same manner as in Example 5. This copolymer composition was electrochemically reduced by following the procedure of Example 2. The resultant product was washed with methanol and then dried, to produce a red film of copolymer.

The infrared spectrum of this copolymer is shown in FIG. 1. By comparison of the absorbances at the peaks of 720 cm⁻¹ and 620 cm⁻¹ in the infrared spectrum, the proportion of the 3-methylthiophene unit contained in the copolymer was found to be 61 mol%.

Figure 2:
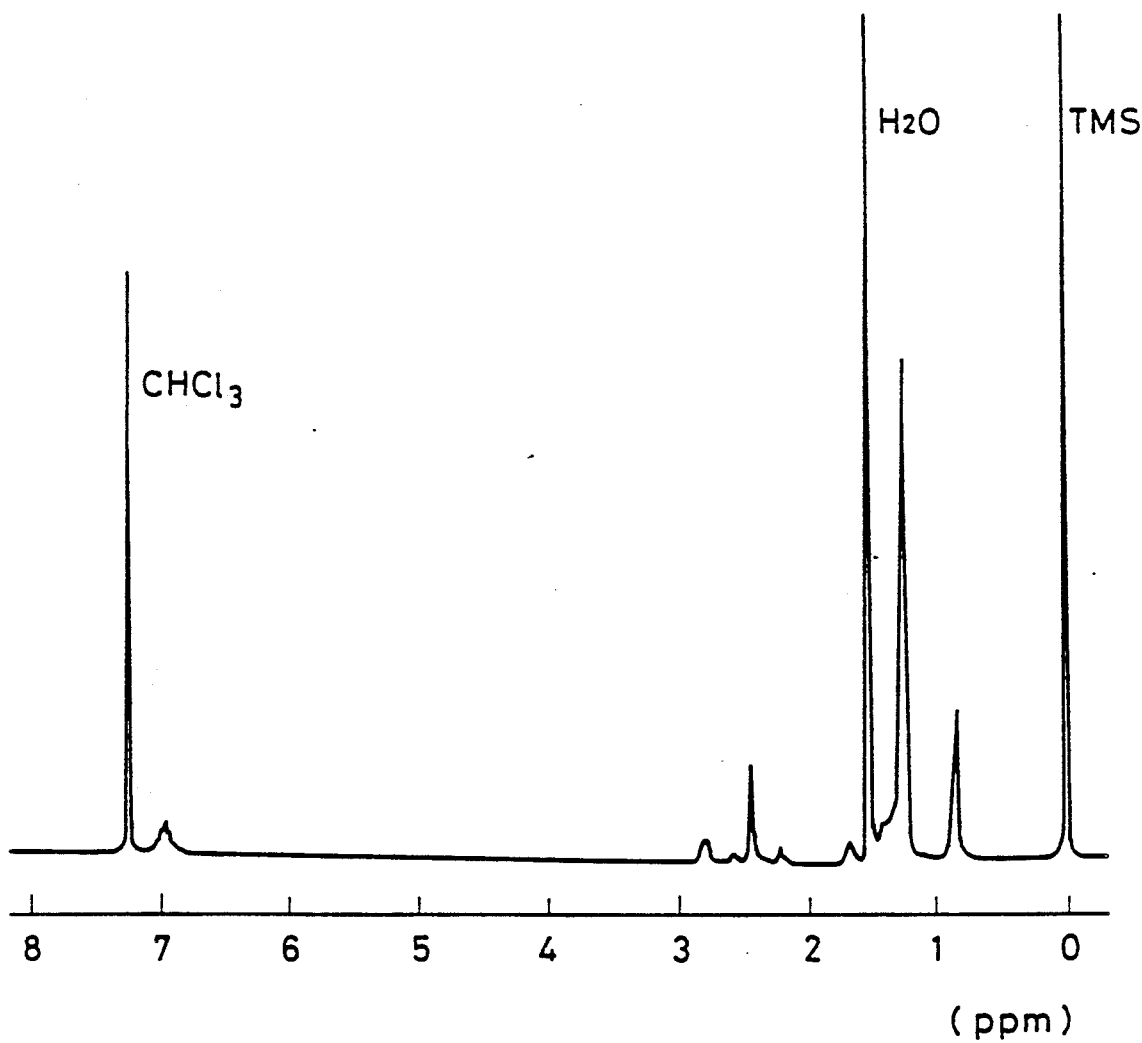
FIG. 2 is a $^1$H-NMR of a copolymer obtained in Example 7.

This copolymer exhibited solubility of about 75% (W/W) in methylene chloride, benzene, and chloroform. The ¹H-NMR of the copolymer dissolved in d-chloroform is shown in FIG. 2.

What is claimed is:

1. An electroconductive copolymer composition consisting essentially of a 3-n-dodecylthiophene-3-methylthiophene electroconductive copolymer and a dopant which is at least one anion selected from the group consisting of hexaflurophosphoric acid ion, hexafluoroarsenic acid ion, tetrafluoroboric acid ion, perchloric acid ion and trifluoromethanesulfonic acid ion, said copolymer comprising first repeating units represented by the formula (I):

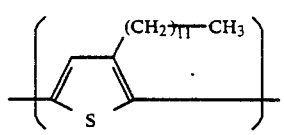
(I)

and second repeating units represented by formula (II):

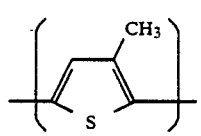
(II)

having said first and second repeating units randomly and linearly arranged, and said copolymer containing said second repeating units in an amount within the range of 34 to 65 mol%, possessing a weight average molecular weight within the range of 60,000 to 100,000 and being doped with 1 to 50 mol%, based on the total weight of said first and second repeating units, of said dopant.

2. 3-n-Dodecylthiophene-3-methylthiophene copolymers comprising first repeating units represented by the formula

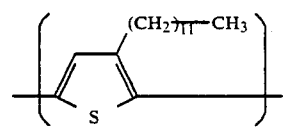
(I)

and second repeating units represented by the formula (II):

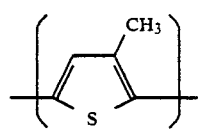
(II)

said copolymer having said first and second repeating units randomly and linearly arranged, containing said second repeating units in a an amount within the range of 34 to 65 mol%, and possessing a weight average molecular weight in the range of 60,000 to 100,000.

3. A method for the production of an electroconductive copolymer composition consisting essentially of a 3-n-dodecylthiophene-3-methylthiophene electroconductive copolymer and a dopant which is at least one anion selected from the group consisting of hexafluorophosphoric acid ion, hexafluoroarsenic acid ion, tetrafluoroboric acid ion, perchloric acid iona nd trifluoromethanesulfonic acid ion, said copolymer comprising first repeating units represented by formula (I):

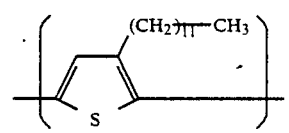
(I)

and second repeating units represented by formula (II):

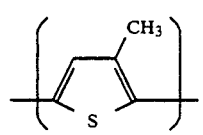
(II)

said copolymer having first and second repeating units randomly and linearly arranged, containing said second repeating in an amount within the range of 34 to 65 mol% possessing a weight average molecular weight in the range of 60,000 to 100,000 and being doped with 1 to 50 mol%, based on the total weight of said first and second repeating units, of said dopant, said method comprising the steps of:

providing an anode and a cathode in a solution consisting of a solvent, 3-n-dodecylthiophene, 3-methylthiophene and a supporting electrolyte capable of releasing the dopant; and subsequently conducting electrolysis by passing an electric current through said solution via said electrodes.

4. A method for the production of a 3-n-dodecylthiophene-3-methylthiophene electroconductive copolymer comprising first repeating units represented by the formula (I):

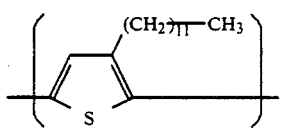
(I)

and second repeating units represented by formula (II):

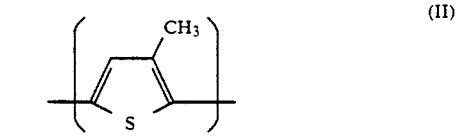
(II)

said copolymer having first and second repeating units randomly and linearly arranged, containing said second repeating units in an amount within the range of 34 to 65 mol%, and possessing a weight average molecular weight in the range of 60,000 to 100,000, said method comprising the steps of:

providing an anode and a cathode in a solution consisting of a solvent, 3-n-dodecylthiophene, 3-methylthiophene and a supporting electrolyte capable of releasing a dopant;

subsequently conducting electrolysis by passing an electric current through said solution via said electrodes; and thereafter continuing passage of electric current with said electrodes reversed in polarity.

5. A method according to claim 4, wherein said dopant is at least one anion selected from the group consisting of hexafluorophosphoric acid ion, hexafluoroarsenic acid ion, tetrafluoroboric acid ion, perchloric acid ion, and trifluoromethanesulfonic acid ion.

* * * * *